(12) United States Patent
Kuwabara et al.

(10) Patent No.: US 7,862,234 B2
(45) Date of Patent: Jan. 4, 2011

(54) LINEAR MOTION GUIDE UNIT

(75) Inventors: Hideki Kuwabara, Gifu-ken (JP); Shigeki Kakei, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 574 days.

(21) Appl. No.: 11/861,942

(22) Filed: Sep. 26, 2007

(65) Prior Publication Data

US 2008/0080795 A1 Apr. 3, 2008

(30) Foreign Application Priority Data

Sep. 27, 2006 (JP) ............................ 2006-262816

(51) Int. Cl.
*F16C 29/06* (2006.01)

(52) U.S. Cl. .......................................... 384/44; 384/13

(58) Field of Classification Search ................... 384/13, 384/15–16, 43–45, 51
See application file for complete search history.

(56) References Cited

U.S. PATENT DOCUMENTS

| | | | | |
|---|---|---|---|---|
| 5,399,023 A | * | 3/1995 | Winkelmann et al. | 384/13 |
| 5,496,113 A | * | 3/1996 | Winkelmann et al. | 384/15 |
| 5,678,927 A | * | 10/1997 | Yabe et al. | 384/13 |
| 6,024,490 A | * | 2/2000 | Shirai | 384/45 |
| 6,082,899 A | * | 7/2000 | Suzuki et al. | 384/13 |
| 6,123,457 A | * | 9/2000 | Suzuki et al. | 384/13 |
| 6,155,717 A | * | 12/2000 | Michioka et al. | 384/15 |
| 6,257,766 B1 | * | 7/2001 | Agari | 384/45 |
| 6,290,394 B1 | * | 9/2001 | Obara et al. | 384/13 |
| 6,705,430 B2 | * | 3/2004 | Michioka et al. | 184/5 |
| 7,066,650 B2 | * | 6/2006 | Ishihara | 384/44 |
| 2007/0053619 A1 | * | 3/2007 | Kuwabara | 384/13 |

* cited by examiner

*Primary Examiner*—Marcus Charles
(74) *Attorney, Agent, or Firm*—Browdy and Neimark, PLLC

(57) ABSTRACT

Lubrication points of lubricant around a rolling element are made in a turnaround passage to ensure proper and steady lubrication by the lubrication system simple in construction, with accompanying sustainable maintenance-free condition for lubrication. The end cap has a recess as large as permitted and a hole to communicate the recess with the turnaround passage. A porous compact is composed a thick block to fit into a deep cavity in the recess, a nose leading lubricant in the turnaround passage, and a conjunctive part between the thick block and the nose. The porous compact fits snugly into the recess in a fashion that the nose comes into rolling-touch at its tip with the rollers as they roll through the turnaround passage.

10 Claims, 8 Drawing Sheets

LINEAR MOTION GUIDE UNIT

FIELD OF THE INVENTION

The present invention relates to a linear motion guide unit comprised of, for example an elongated guide rail and a slider that is allowed to move relatively on the elongated guide rail by virtue of more than one rolling element.

BACKGROUND OF THE INVENTION

Linear motion guide units have been extensively incorporated in recent years between relatively sliding parts in increased industrial fields including machine tools, various assembling machines, conveyors, and so on. Most prior linear motion guide units have been ordinarily fed with lubricant every a preselected interval based on maintenance schedules to make certain of forming the lubricant film separating the rolling elements from the circulating race, ensuring continuous smooth rolling motion of the rolling elements throughout a circulating circuit. Recently advanced machines and instruments, nevertheless, are increasingly needed to make them virtually maintenance-free from many aspects of conserving energy as well as keeping running cost and maintenance cost of equipment reasonable. Correspondingly, the linear motion guide units incorporated in the advanced machinery, especially the linear motion guide units of the sort of roller bearings are also challenged to keep the consumption of lubricant to a minimum, along with keeping linear motion guide units virtually maintenance free for long-lasting lubrication.

With most conventional linear motion guide units in which the sliders are allowed to travel lengthwise of the elongated guide rail by virtue of more than one rolling element, continuous application of lubricant on or between the load-carrying race and the rolling element is inevitable to continue maintaining an adequate lubricant film between the load-carrying race and the rolling element to keep them against metal-to-metal contact that might otherwise occur, thereby making sure of their high durability.

A linear motion guide system operational with less lubricant supply is disclosed in Japanese Utility Model Laid-Open No. H05-71443, which is envisaged delaying the time interval for lubricant supply into an oil bath, thereby reducing the lubricant supply cycles to simplify lubricant supply operation with accompanying reduced maintenance for lubrication. With the prior linear motion guide unit recited earlier, enclosed lubricant reservoirs fit into their associated recesses cut in the outward surfaces of the forward and aft end caps. The lubricant reservoirs are made to communicate with the turnaround passages of the ball circulating circuit. The lubricant reservoirs are made integrally with spouts that are made to fit into their mating lubricant paths made open to the turnaround passages, leading the lubricant out of the reservoirs into the turnaround passages through their associated mating lubricant paths.

Another Japanese Patent Laid-Open No. H11-22726 discloses a linear motion guide unit in which a slider having a movable body including a table, and so on thereon is allowed to move along a guide rail as more than one ball or roller built in the slider rolls through a circulating circuit. With the prior linear motion guide unit recited earlier, end seals adapted to be secured to forward and aft ends of the slider are each provided therein with a lubricant port and a lubricant groove communicating with the lubricant port while made open to a turnaround passage. A member such as felt adapted to hold and apply the lubricant fits into the lubricant groove, which is rimmed evenly with raised edges to prevent the lubricant from leaking out through between the mating surfaces of the end seal and the associated end of the slider.

The linear motion guide system referred earlier as first example of prior art, nevertheless, is in need of preparing the oil reservoir member to keep any amount of lubricant therein. Moreover, although the oil reservoir member displays intricate configuration in which the spouts are in closer formation to the turnaround passages to make sure of positive seepage of the lubricant out of the oil reservoir member, yet it would be very tough to deliver constantly a desired amount of lubricant in increments. With the linear motion guide unit referred earlier as second example of prior art, yet the member such as felt adapted to hold and apply the lubricant fits into the lubricant groove rimmed around there with raised edges to prevent the lubricant from leaking out through between the mating surfaces of the end seal and the associated end of the slider, the lubricant applicator such as felts alone would be difficult to feed constantly a limited minuscule quantity of lubricant.

Meanwhile, there are two members of the class of linear motion guide units, one of which has balls and the other has cylindrical rollers. With the linear motion guide unit in which cylindrical rollers are selected as the rolling elements, alignment problems to guide rollers in good rolling order without leaning in rolling posture are more encountered, compared with the construction using balls. To cope with this, the cylindrical rollers have to be guided not only on their circular rolling surfaces, but also on their axially opposite end surfaces. Conventionally, there is no linear motion guide unit constructed to meet with an aspect of allowing the rollers to roll through the circulating circuit over a long-lasting service life with adequate application of lubricant, making certain of steady reliability of the maintenance-free on lubricant application. Advanced technology has come to hope a linear motion guide unit which, even though simple in construction in favor of commercial production, is capable of retaining ample lubricant enough to make sure of steady and sustainable lubrication over a long-lasting service life for the cylindrical rollers that roll through a circulating circuit.

On the other side, a linear motion guide unit developed to deal with the problem as stated earlier is disclosed in a commonly-assigned senior Japanese patent application, which was opened to public with Japanese Patent Laid-Open No. 2007-100951 after the Convention priority date of this application and further whose U.S. counterpart was opened under U.S. publication No. 2007-0053619A1. The disclosure of U.S. publication No. 2007-0053619A1 is herein incorporated by reference. The linear motion guide unit was designed to lubricate the rolling elements in the turnaround passages to make sure of positive and sustainable lubrication with the use of simplified lubrication design, with accompanying reduced maintenance for lubrication. In the linear motion guide unit disclosed in the commonly-assigned earlier application, the end cap is made therein with holes starting at the outward end surface and reaching the associated turnaround passage, and further made recessed on the outward end surface thereof. There is provided a lubricant reservoir with raised noses made of a porous compact befitting to impregnation with lubricant. The lubricant reservoir fits into the recess sinking below the outward end surface of the end cap in a formation the raised noses extend through the holes in the end cap to reach the turnaround passage, exposing their tips to the turnaround passage to define in part the curved inside surface of the turnaround passage. The cylindrical rollers as they roll through the turnaround passage are allowed coming into rolling-touch with the exposed noses of the lubricant reservoir, thereby receiving lubricant film from the raised noses of the lubricant reservoir. Thus, the cylindrical rollers are kept better lubrication throughout the circulating circuit.

Though the lubrication design for the cylindrical rollers constructed as stated in the commonly-assigned senior application is befitting to the linear motion guide unit comparatively bulky or large in construction of the class that the cylindrical rollers are selected as the rolling elements, yet it remains a major challenge to develop any lubrication design that is better adaptable for smaller linear motion guide units of the class in which the cylindrical rollers are selected as the rolling elements.

SUMMARY OF THE INVENTION

The present invention has for its primary object to overcome the major challenges as stated earlier in the linear motion guide unit of the class in which cylindrical rollers are selected as rolling elements, and to provide a linear motion guide unit having a lubrication system which, although made simpler in construction than earlier developed, is suited to achieve sustainable maintenance-free operation for steady lubrication to rolling elements. More particularly, the present invention provides an improvement in a linear motion guide unit of the class in which the lubrication system is made of a porous compact capable of retaining lubricant therein, the porous compact being installed in a recess made in an end cap. Improved lubrication system of the present invention not only avails effectively a recess that is conventionally made in the end cap to sink below the outward surface facing the end seal for purposes of weight loss and material saving, but also gets the recess enlarging more deeply into the end cap to make the recess as large as allowable in volume to ensure a deep concavity ample to provide a lubricant reservoir. Correspondingly, the porous compact is formed in a configuration as large as possible to snugly conform to or fit into the deep recess, thereby making it easier to retain ample amount of lubricant therein even when the end cap is small in construction. Thus, the present invention provides a linear motion guide unit in which the maintenance-free operation for lubrication around the rolling elements can be achieved securely with ease for long-lasting service life by virtue of the porous compact impregnated with lubricant and installed in the deep recess cut in the end cap.

The present invention is concerned with a linear motion guide unit; comprising an elongated guide rail having a raceway surface extending in a lengthwise direction of the guide rail, and a slider allowed to move lengthwise of the elongated guide rail in a sliding manner, the slider being composed of a carriage having thereon a second raceway surface in opposition to the first raceway to define a load-carrying race between them and having therein a return passage extending in parallel with the load-carrying race, end caps secured to forward and aft ends of the carriage, one to each end, and made therein with turnaround passages joining the race and the return passage together with one another, an end seal secured on the end cap, and more than one rolling element of either ball or roller allowed to roll through a circulating circuit made up of the load-carrying race, return passage and the turnaround passages;

wherein the end caps are each made to sink along the lengthwise direction below an outward surface thereof facing the associated end seal to thereby have a deep recess into which fits a porous compact of a shape conforming to the recess, the porous compact being impregnated with lubricant, and wherein the end cap is holed to communicate the recess with the associated turnaround passage to allow the porous compact exposing itself to the turnaround passage, coming into rolling-contact with the rolling element rolling through the turnaround passage to apply the lubricant on the rolling element.

In one aspect of the present invention, a linear motion guide unit is disclosed in which the recess made in the end cap includes a deep cavity lying at a topside of the end cap, a shallow shelf spreading downwards from the topside of the end cap, and a pit extending from the shelf to the hole that opens into the turnaround passage.

In another aspect of the present invention, a linear motion guide unit is disclosed in which the porous compact is composed of a thick block to fit into the deep cavity in the recess to reserve considerable lubricant, a thin plate to conform to the shallow shelf in conjunction with the thick block, and a nose raised above the thin plate to extend into the associated pit in a way leading lubricant to the hole opening to the turnaround passage.

In another aspect of the present invention, a linear motion guide unit is disclosed in which a tip of the raised nose exposed to the turnaround passage is made elongated in rolling direction of the roller.

In a further another aspect of the present invention, a linear motion guide unit is disclosed in which the thick block of the porous compact is prepared to snugly fit into the deep cavity, which is made in any one of sidewise opposed bulgy portions of the end cap at an upper region where there is no turnaround passage.

In another aspect of the present invention, a linear motion guide unit is disclosed in which a pair of the circulating circuits is made in each of widthwise opposing sides of the slider in geometry that the turnaround passages of the paired circulating circuits intersect each other in the end caps in staggered relation in sliding direction of the slider.

In another aspect of the present invention, a linear motion guide unit is disclosed in which the paired turnaround passages are staggered one another in the end caps to provide an outward turnaround passage and an inward turnaround passage which are spaced apart away from one another in any one of the end caps, and the porous compacts expose themselves to the respective outward turnaround passages through the holes communicating the recess with the turnaround passages.

In a further another aspect of the present invention, a linear motion guide unit is disclosed in which the hole in the end cap to communicate the recess with the turnaround passage is made nearer towards the return passage far away from the load-carrying race.

In another aspect of the present invention, a linear motion guide unit is disclosed in which the recess is divided into two halves that are separated sidewise of the end cap from one another and the porous compacts fit into the halves of the recess in a fashion that any one of the porous compacts apply lubricant the rollers rolling through any one pair of the sidewise spaced circulating circuit pairs while another porous compact lubricates the rollers rolling through the other pair of the sidewise spaced circulating circuit pairs.

In another aspect of the present invention, a linear motion guide unit is disclosed in which the sidewise spaced halves of the recess are communicated with each other through a middle recess and the porous compacts conforming to the halves of the recess are joined together by a connecting part of porous compact material, which fits into and conforms to the middle recess.

In a further another aspect of the present invention, a linear motion guide unit is disclosed in which the porous compact is prepared by first compacting finely powdery ultrahigh molecular weight synthetic resin, and subsequently sintering at elevated temperature the resulting compact to thereby finish sintered resinous member having open-porous or open-cellular texture in which pores or cells preserved among fine particles are made open to each other, serving to absorb lubricant, which fills pores or cells to be held better in the cellular texture. As an alternative, the finely powdery synthetic resin is any one selected from polyethylene and polypropylene.

With the linear motion guide unit constructed as stated earlier, the application of lubricant around the rolling elements of either rollers or balls is carried out at the turnaround passages as the rolling elements roll through the circulating circuits. The porous compact soaked or impregnated with lubricant is installed in a way exposed in part to the turnaround passage to come into rolling-contact with the rolling elements when they roll through the turnaround passages, thereby applying lubricant around the rolling elements with accompanying sustainable maintenance-free condition for lubrication. The lubrication in which the lubricating point is made in the turnaround passage is in favor of steady maintenance-free lubrication even with simple in construction. With the linear motion guide unit constructed as stated earlier, especially, the outward end surface of the end cap sinks inwards at a specific location far away from the turnaround passage to make the recess more in depth than ever, thereby rendering the recess as large as possible in volume, in particular, at the cavity to reserve much lubricant therein. The porous compact whose open-porous or open-cellular texture is well preserved fits snugly into the deep recess in a way the leading nose thereof is exposed to the hole to communicate the recess with the turnaround passage. Lubricant held in the porous compact seeps through the nose and then adheres around the rolling elements as they come into the rolling-contact with the tip of the nose. Thus, the lubrication system of the present invention even with simple in construction is advantageous to steady and ease application of lubricant around the rolling elements for a long-lasting service life.

DETAILED DESCRIPTION OF THE PREFERRED EMBODIMENTS

The linear motion guide unit according to the present invention is primarily designed to carry out lubricant application to the rolling elements, whether cylinders or balls, in specified locations in the turnaround passages made in the end caps to thereby positively lubricate the rolling elements over long-lasting service life, with accompanying reduced maintenance for lubrication. In the versions of the present invention referred hereinafter, although but the lubricating system to feed lubricant around the rolling elements is explained in one of two members of the class of linear motion guide units in which the rollers or cylinders are selected as rolling elements, it will be appreciated that the lubricating system, if lubrication points are in the turnaround passages, may be likewise used in the other member of the class in which the balls are replaced by the rollers.

The linear motion guide unit constructed according to the present invention is adapted for use in any relatively sliding components in machinery as diverse as machine tools, various assembling machines, conveyers, robotic machines, semiconductor equipment, measurement/inspection instruments, medical instruments, micromachines, and so on. The present invention is envisaged developing especially the linear motion guide unit, which can cope with demand to keep better lubrication to the rolling elements over long-lasting operation to make sure of smooth movement of the rolling elements throughout the circulating circuit even with maintenance-free condition for lubricant replenishment.

Figure 1:
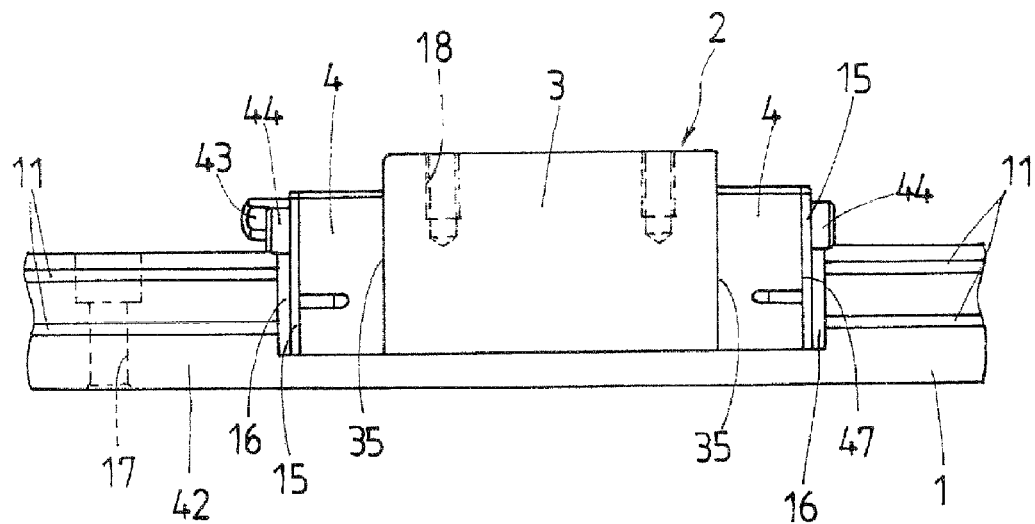
FIG. 1 is a partially cutaway view in front elevation illustrating a preferred embodiment of a linear motion guide unit according to the present invention.
Figure 2:
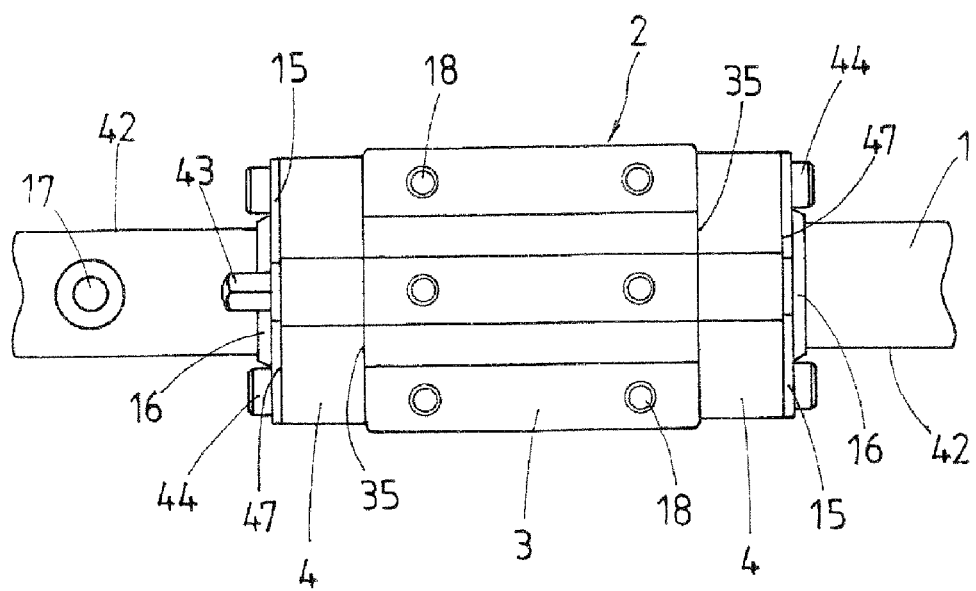
FIG. 2 is a view in plan of the linear motion guide unit of FIG. 1.
Figure 3:
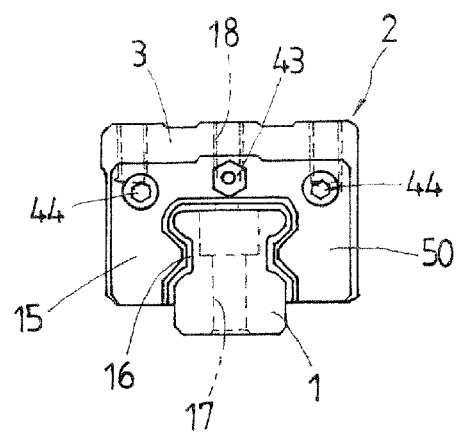
FIG. 3 is a view in side elevation of the linear motion guide unit of FIG. 1.
Figure 4:
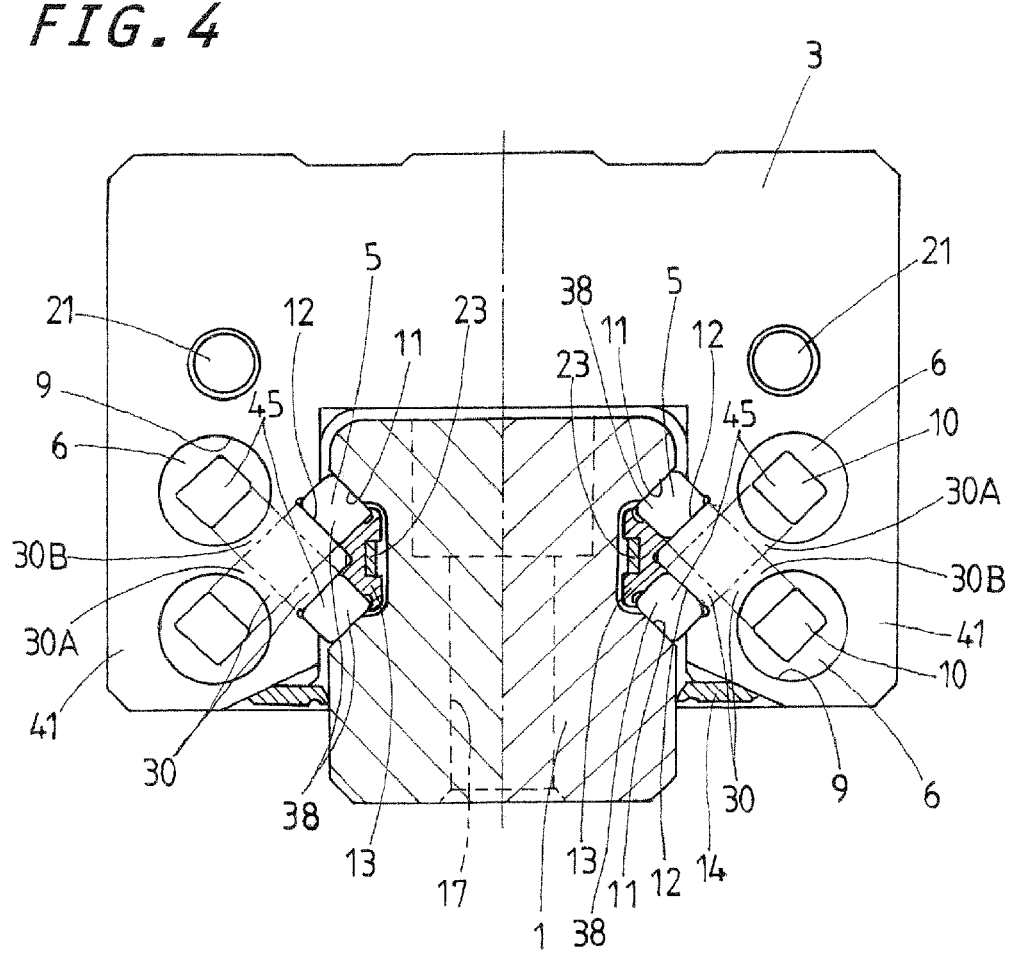
FIG. 4 is an enlarged view in transverse section of the linear motion guide unit of FIG. 1, but in which an end cap is removed to expose the inside of a slider of FIG. 3.
Figure 5:
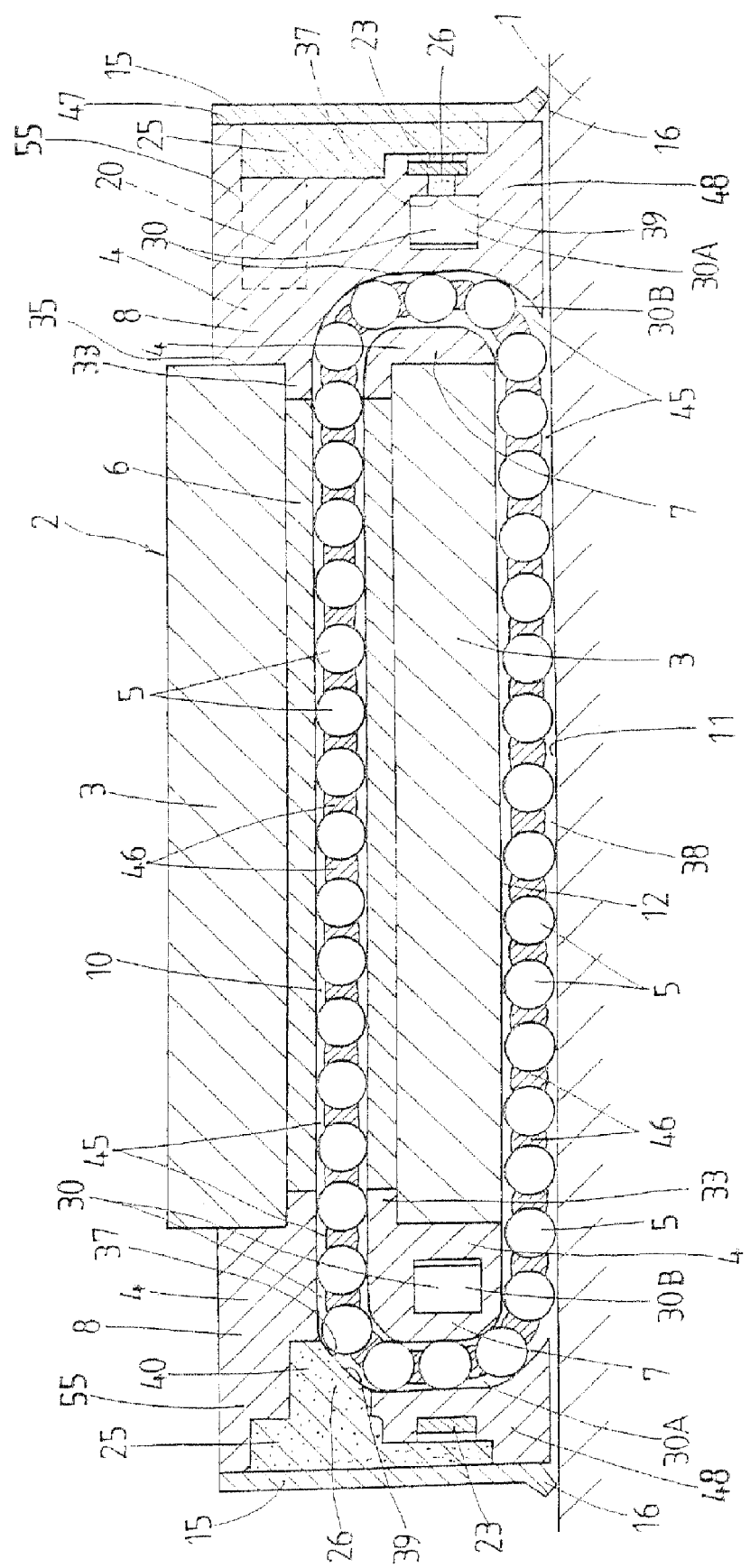
FIG. 5 is a view in longitudinal section of the slider FIG. 1 to illustrate geometry of a circulating circuit to allow rolling elements running through there.

Referring now in detail to the drawings, the linear motion guide unit according to the present invention will be explained below. The linear motion guide unit constructed according to the present invention as shown in FIGS. 1 to 5 is mainly comprised of an elongated guide rail 1 made on each lengthwise side 42 thereof with a pair of raceway surfaces 11 or first raceway surfaces, and a slider 2 having sidewise opposing bulgy portions 50 that fit over or conform to the guide rail 1 in a way to allow the slider 2 traveling relatively to the guide rail 1 by virtue of more than one roller or cylinder 5. The linear motion guide unit further includes a looped circulating circuit 45 to allow the rollers 5 to roll through there, the circulating circuit being made up of a load-carrying race 38 defined between the guide rail 1 and the slider 2, a return passage 10 made in the slider 2 in a direction parallel with the race 38, and forward and aft turnaround passages 30 joining the race 38 and the return passage 10 together with one another. A separator 46 as shown in FIG. 5 is installed between any two adjoining rollers 5 to circulate through the looped circuit 45 together with the rollers 5.

The slider 2 is mainly composed of a carriage 3 whose sidewise opposing bulgy portions 50 are each made thereon with a pair of second raceway surfaces 12 lying in opposition to the raceway surfaces 11 on the guide rail 1 to define upside and down side races 38 between opposite first and second raceway surfaces 11 and 12 and further made therein with the return passages 10 extending in parallel with the second raceway surfaces 12, forward and aft end caps 4 disposed on lengthwise opposing end faces 47 of the carriage 3 and further made therein with the turnaround passages 30 (30A, 30B) to join the upside and downside races 38 to their associated upside and downside return passages 10, respectively, end seals 15 secured to outward surfaces 47 of the end caps 4 and further provided with lips 16 to close clearances between the guide rail 1 and the slider 2, and more than one roller 5 allowed rolling through the circulating circuits 45.

With the linear motion guide unit of the present invention, the slider 2 has the paired circulating circuits 45 in the sidewise opposing bulgy portions 50 thereof, respectively. The paired circulating circuits 45 as shown in FIG. 4 are arranged with one another in such geometry that the rollers 5 rolling through one of the paired circulating circuits 45 are allowed to transfer from the downside race 38, carrying downward load because of the slider 2, into the associated upside return passage 10 in the carriage 3 in a circulating manner. In contrast, the rollers 5 rolling through the other of the paired circulating circuits 45 are allowed to transfer from the upside race 38, carrying upward load because of the slider 2, into the associated downside return passage 10 in the carriage 3 in a circulating manner.

As seen in FIGS. 6 to 9, the turnaround passages 30 (30A, 30B) made in any one of sidewise opposing bulgy portions 48 of the end cap 4 are arranged to intersect one another in a fashion that any one BOA of the turnaround passages 30 is staggered from the other 30B. The end caps 4 are each made up of spacer combination 7 to define curved tubular halves of the turnaround passages 30, and an end cap main major part 8 to define outside curved tubular halves 36 of the turnaround passages 30. The spacer combinations 7 are each composed of a larger spacer part 7A to be fit in the end cap major part 8 and a smaller spacer part 7B to be nested inside the larger spacer part 7A. On the backside of the end cap 4, especially, the end cap major part 8 are made therein with recesses into each of which the larger spacer part 7A fits to provide on one side thereof an inside curved tubular half of the longer turnaround passage 30A while providing on the other side thereof an outside curved tubular half of the shorter turnaround passage 30B. Inside the larger spacer part 7A, the smaller spacer part 7B is further nested in a geometry staggered from one another to provide an inside curved tubular half of the shorter turnaround passage 30B. More especially, the end cap 4 is recessed at, for example the left bulgy portion 48 thereof, to receive therein the large spacer part 7A into which the smaller spacer part 7B in turn fits in a staggered relation with one another. Thus, the forward and aft end caps 4 are each made in their left side bulgy portions 50 with the shorter turnaround passage 30B and the longer turnaround passage 30A intersecting with one another in a way staggered from each other in lengthwise direction. The longer turnaround passage 30A is finished by a conjunction of the outside curved tubular half of the end cap major part 8 with the inside curved tubular half of the larger spacer part 7A while the shorter turnaround passage 30B is completed with a conjunction of the outside curved tubular half of the larger spacer part 7A and the inside curved tubular half of the smaller spacer part 7B.

Figure 9:
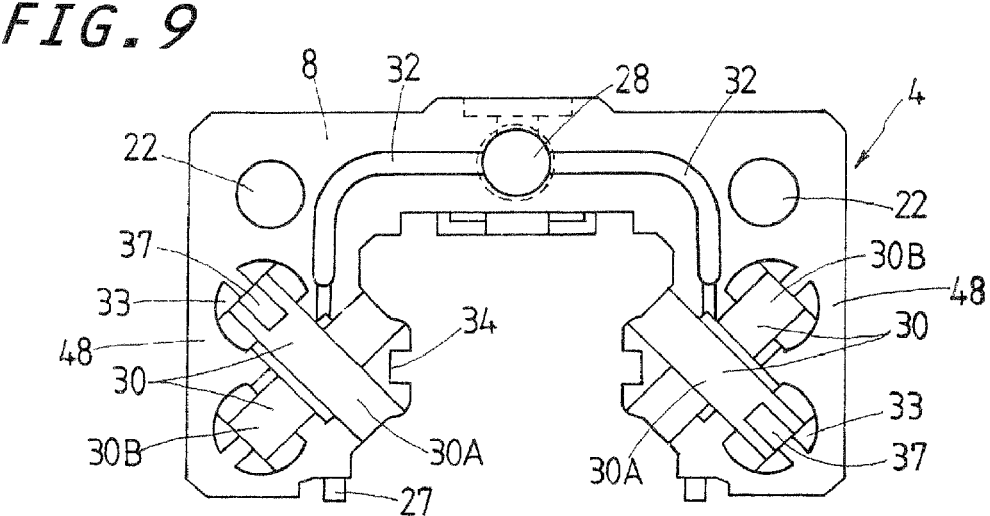
FIG. 9 is a view in rear elevation of the end cap major part of FIG. 8.
Figure 10:
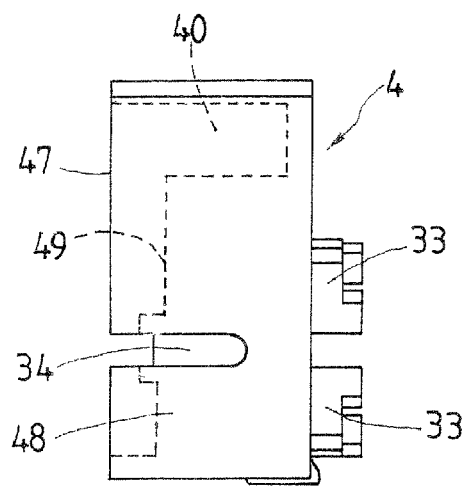
FIG. 10 is a view in side elevation of the end cap major part of FIG. 8.

The circulating circuit 45 as shown in FIG. 5 is composed of the load-carrying race 38, the return passage 10, and the turnaround passages 30 lying opposite lengthwise of the slider 2, any longer one 30A of the turnaround passages 30 being defined by the conjunction of the end cap major part 8 with the larger spacer part 7A while the shorter one 30B being provided by a nest of the larger and smaller spacer parts 7A and 7B, which fits into the end cap major part 8. The longer and shorter turnaround passages 30A and 30B in the end caps 4, as shown in FIG. 9, are different in staggered geometry of them between the right and left bulgy portions 48 of the end caps 4, which are in sidewise symmetry with respect to the sliding direction of the slider 2. With the turnaround passage 30 depicted in phantom lines in FIG. 4, especially, the longer turnaround passage 30A situated corresponding to the right bulgy portion 41 of the carriage 3 is made to connect the downside load-carrying race 38 with the upside return passage 10 while in the left bulgy portion 41 of the carriage 3 to connect the upside load-carrying race 30 with the downside return passage 10. In contrast, the shorter turnaround passage 30B situated in the right bulgy portion 41 of the carriage 3 is made to connect the upside load-carrying race 38 with the downside return passage 10 while in the left bulgy portion 41 of the carriage 3 to connect the downside load-carrying race 38 with the upside return passage 10.

The end cap major part 8 has spigots 33 extending into abutment against the associated return passages 10. The spigots 33 are made to conform to outside curved tubular halves of their associated turnaround passages 30 to conjoin with the spacer combinations 7, thereby communicating with the return passages 10 to connect the turnaround passages 30 in the end cap 4 to their associated return passages 10 in the carriage 3 without entailing any difference between them. The end cap 4 is made therein with the lubrication ports 29, some of which are made in the middle area, and the other are on the sides of the end cap 4. All lubrication ports 29 but one put to lubrication use are plugged with closures that fit into the internal threads 28 cut in the ports 29. The end cap 4, after precisely positioned relatively to the carriage 3, is joined to the carriage 3 with the bolts 44 that extend through the bolt holes 22 in the end cap 4. Abutment of a sleeve 6 against the spigots 33 of the end cap 4 keeps accurate location of the end cap 4 to the sleeve 6, making sure of precise alignment of the spigots 33 of the end cap 4 with the return passages 10 in the carriage 3. Thus, construction the sleeves 6 and the spigots 33 of the end cap 4 come into flush abutment each other end to end makes certain of finishing the circulating circuits 45 of rectangle in transverse section, which transfer from the return passages 10 to the spigots 33 in the end cap 4 without causing any discontinuity or gap at the connection between them. Coplanar continuity with no gap between the turnaround passages 30 in the end caps 4 and the associated sleeves 6 inside fore-and-aft bores 9 in the carriage 3 helps the rollers 5 transfer smoothly from the turnaround passages 30 to their associated return passages 10 and also from the return passages 10 to the turnaround passages 30 in a circulating manner.

With the liner motion guide unit small in construction in which the rollers 5 are selected for the rolling elements as stated earlier, a retainer plate 13 as shown in FIG. 4 is arranged to carry the rollers 5 rolling over the load-carrying race 38 and further keep retaining the rollers 5 even after the slider 2 has been taken apart from the guide rail 1, thereby keeping the rollers 5 against falling out of the slider 2. The retainer plate 13 is held in the associated load-carrying race 38 in the carriage 3 in a way lying lengthwise of the slider 2 by a retainer band 23 that fits at fore-and-aft ends thereof into notches 34 cut in the forward and aft end caps 4.

Figure 6:
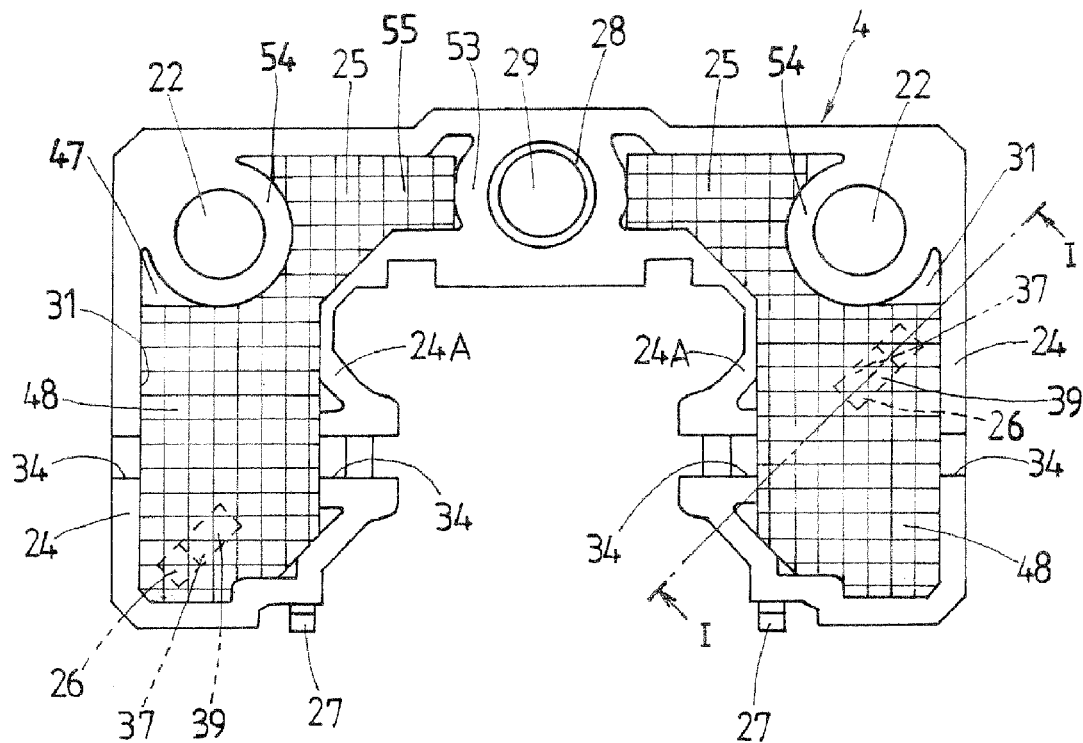
FIG. 6 is a view in front elevation showing a version of the end cap of FIG. 1.
Figure 7:
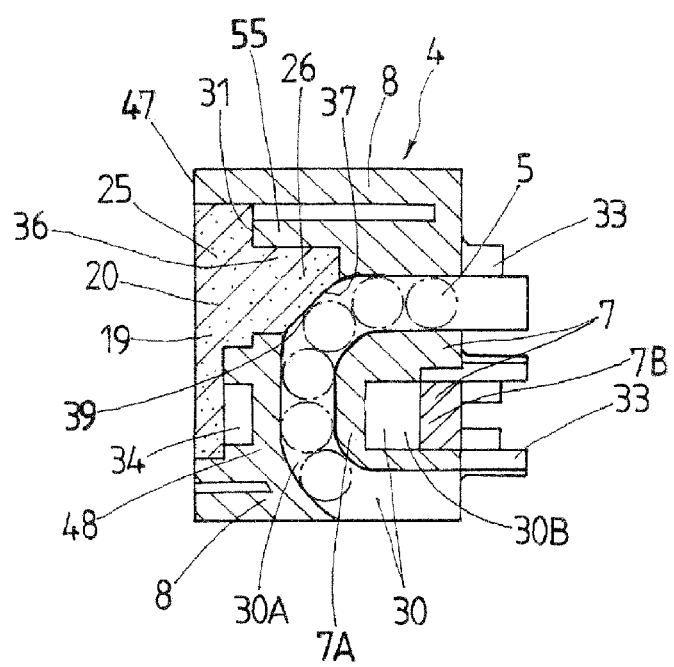
FIG. 7 is a view in transverse section of the end cap, the view being taken on the plane of the line I-I of FIG. 6.

Meanwhile, the end cap 4 as shown in FIGS. 6 and 7 is made therein with the recess 31 opening to the outward end surface 47 of the end cap 4 facing the associated end seal 15.

With the conventional end cap 4 in the slider 2 constructed as stated earlier, the end cap major part 8 is inherently recessed at 31 to the extent permitted to keep the mechanical strength of the end cap itself properly for purposes of weight loss, material saving and the provision of relief for a mold in casing operation. To this end, the end cap major part 8 usually sinks below the outward end surface 47 thereof with leaving outer and inner peripheral edges 24 and 24A, which border the sidewise opposite recesses 31 made less in depth in areas nearer the turnaround passages 30 in the bulgy portions 48 while deeper in a middle area far away from the turnaround passages 30. Improved lubrication system of the present invention makes aggressive use of the recess 31 constructed as stated earlier.

Figure 8:
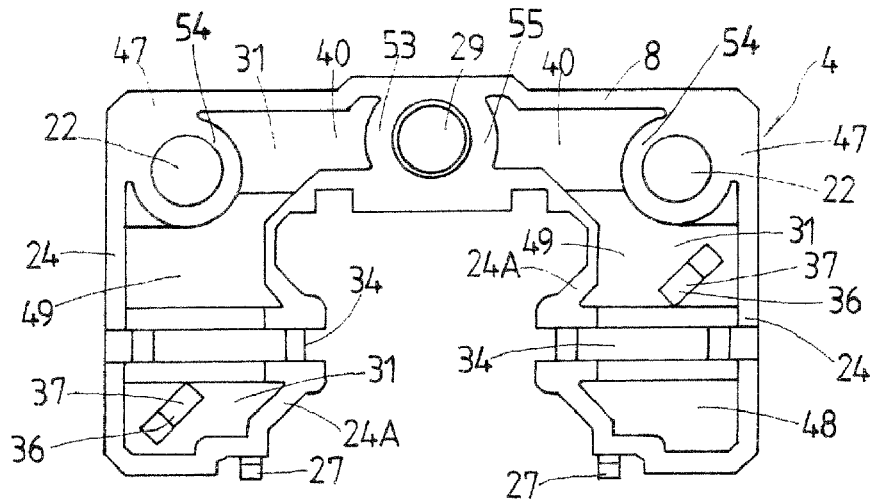
FIG. 8 is a view in front elevation of an end cap major part, but in which a spacer part and a porous compact are removed from the end cap of FIG. 6.

The linear motion guide unit envisaged in the present invention needs to make the end caps 4 in themselves smaller in construction. This means that the end cap 4 has little redundancies to provide the recess around a boss 53 in which is made the lubrication port 29. Thus, the recess 31 as shown in FIGS. 6 to 8 is divided into two halves that are separated sidewise from one another in perpendicular to the sliding direction of the end cap 2. The recess 31 is made as large as possible in volume, especially spreading to include deep cavities 40 lying opposite sidewise to one another with surrounding the lubrication port 29, shallow shelves 49 extending from the deep cavities 40 to the associated outward end surface 47, and deep pits 36 extending from the shallow shelves 49 to holes 37 that are opened to the turnaround passages 30. The holes 37 made in the recess 31 inside the end cap 4 are at bottoms of the pits 36 nearer towards the return passages 10 far away from the load-carrying races 38. Moreover, the holes 37 are made in the shape extending in the traveling direction of the rollers 5 to ensure rolling-contact with the rollers 5 over a long distance enough to apply significant lubrication. The holes 37 are each made in, for example rectangular configuration having a long side equivalent to the diameter of the roller 5 and a short side less or equal a half the axial length of the roller. The holes 37 are opened to their associated longer turnaround passage 30A, but different in location between the left and right bulgy portions 48 of the end cap 4. For example as seen in FIG. 8, the hole 37 in the right bulgy portion is at middle location while the other in the left bulgy portion 48 is at lower corner. Thus, the paired circulating circuits 45 can be surely lubricated with lubricant at their longer turnaround passages 30A.

The linear motion guide unit constructed according to the present invention features that the outward end surfaces 47 of the end caps 4 sink largely in depth to make the recesses 31 as large as possible in volume and porous compacts 25 impregnated with lubricant fit into the recesses 31 to apply on the rollers 5 as they roll through the longer turnaround passages 30A. The porous compact 25 is designed to fit snugly into the associated recess 31, and especially composed of a thick block 20 to fit into the deep cavity 40 in the recess 31 to reserve considerable lubricant, a thin plate 19 to conform to the shallow shelf 49 in the recess 31, and a nose 26 raised above the thin plate 19 to extend into the associated pit 36 in the recess 31 hole 37 in a way leading lubricant to towards the hole 37 opening to the turnaround passage 30. The thick blocks 20 of the porous compacts 25 are prepared to fit into the deep cavities 40, which are made in the bulgy portions 48 of the end cap 4 at their upper regions 55 where there is no turnaround passage 30. Thus, the blocks 20 of the porous compacts 25 is made as large as possible in volume to make the most of deep recess 31 in the end cap 4 to reserve the large quantity of lubricant therein.

The upper regions 55 in the end cap 4, because of being made therein with central boss 53 for the lubrication port 29 and sidewise opposing bosses 54 for bolt holes 22 and further rimmed entirely with the outward and inside edges 24, 24A around there, are rich in rigidity and mechanical strength sufficiently to allow the deep cavities 40. The noses 26 of the porous compacts 25 are beveled at their tips 39 extending slightly beyond the associated holes 37 to be exposed into the turnaround passages 30. The beveled tips 39 of the noses 26 fit into the associated holes 37 to form planar surfaces that are secant linearly the curved turnaround passages 30 when viewed in lengthwise section of the slider 2. Thus, the noses 26 of the porous compacts 25 have no prominence at both leading and trailing areas of the beveled tips 39 to come into no engagement with the rollers 5 as they roll through the turnaround passages 30. On the other side, the beveled tips 39 most overhang midway between the leading and trailing ends thereof against the rollers 5. With linear motion guide unit in which the forward and aft end caps 4 have sidewise spaced recesses 31, the porous compacts 25 fit into the right and left recesses 31, one to each recess.

Figure 11:
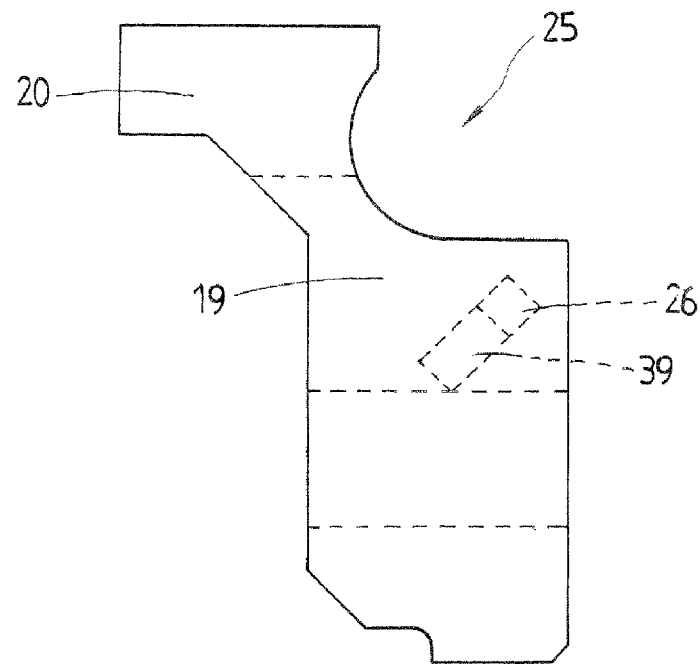
FIG. 11 is a view in front elevation showing a version of a porous compact to be installed inside a deep cavity made on the right of the end cap of FIG. 6.
Figure 12:
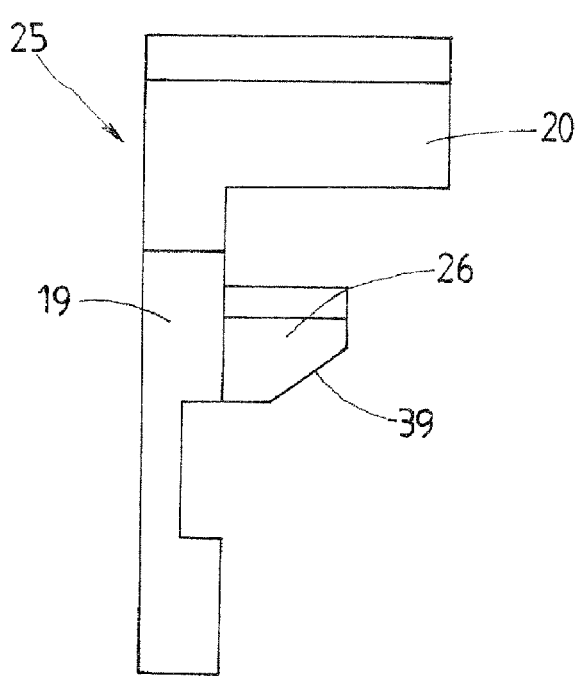
FIG. 12 is a view in side elevation of the porous compact of FIG. 11.
Figure 13:
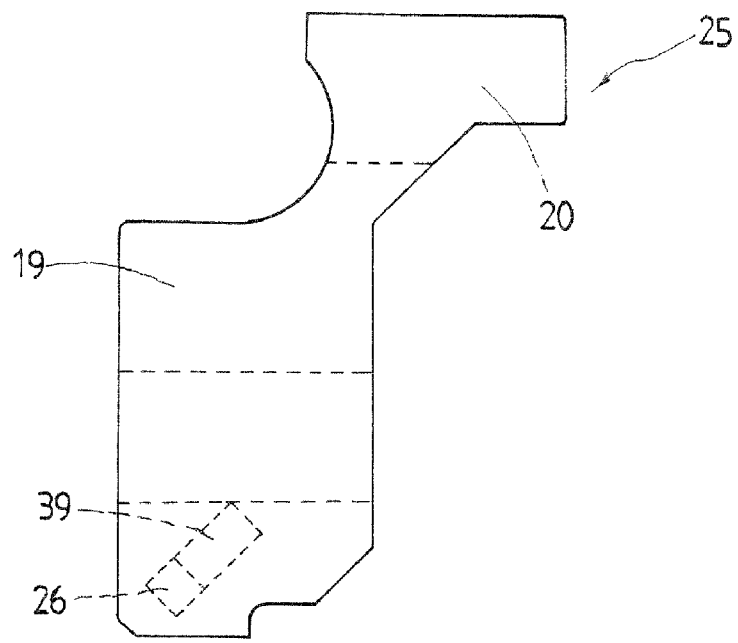
FIG. 13 is a view in front elevation showing another version of the porous compact to be installed inside another deep cavity made on the left of the end cap of FIG. 6.
Figure 14:
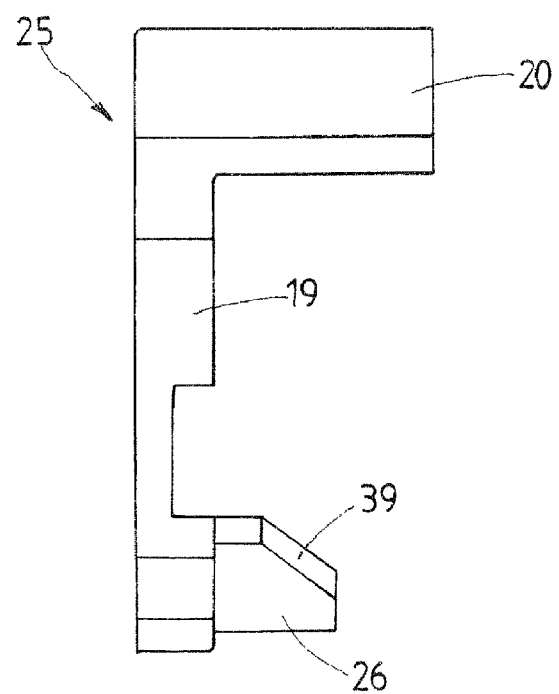
FIG. 14 is a view in side section of the porous compact of FIG. 13.

With the linear motion guide unit of the present invention, especially, the thick blocks 20 of the porous compacts 25 to reserve more lubricant are each accommodated in the recess 31 at the deep cavity 40, which is made in a local area lying between the middle lubrication port 29 and any one of the sidewise spaced bolt holes 22 and far away from the associated turnaround passage 30 to get the recess 31 as large as allowed. Thus, the thick block 20 of the porous compact 25 is designed to snugly fit into or conform to the deep cavity 40 of the recess 31, making the most of the overall volume of the deep cavity 40 to render the impregnated quantity of lubricant as much as possible. In the porous compact 25 lying inside the recess 31 on the right side of the end cap 4, the nose 26 with the beveled tip 39 to come into sliding contact with the rollers 5, as shown in FIGS. 11 and 12, is in-between location. On another porous compact 25 lying inside the recess 31 on the left side of the end cap 4, the nose 26 with the beveled tip 39 to come into sliding contact with the rollers 5, as shown in FIGS. 13 and 14, is formed at the bottom. Considerable amount of lubricant can be reserved in the thick block 20 of the porous compact 25 constructed as stated earlier, however small the linear motion guide unit is made in construction. Moreover, only fitting the porous compact 25 into the recess 31 made in the end cap 4 is sufficient to secure the maintenance-free condition for lubrication over the long service life.

As seen in FIGS. 5 to 7, the porous compacts 25 fit onto their associated end caps 4 to close up the notches 34, which are made to fasten the retainer band 23 to the end caps 4. Upon assembly of the porous compacts 25 onto the slider 2, the forward and aft end caps 4 are first applied to the associated end faces 35 of the carriage 3. Into the notches 34 in the end caps 4, next the retainer bands 23 are set and fastened at their forward and ends, after which the porous compacts 25 fit into the recesses 31 in the end caps 4 built in the slider 2.

The porous compact 25 is prepared by first compacting finely powdery ultrahigh molecular weight synthetic resin, and subsequently sintering at elevated temperature the resulting compact to thereby finish sintered resinous member having open-porous or open-cellular texture in which pores or cells preserved among fine particles are made open to each other, serving to absorb lubricant, which fills pores or cells to be held better in the cellular texture without the likelihood of spontaneous leakage after the porous compact 25 has fit into the recess 31. Selecting polyethylene or polypropylene as finely powdery synthetic resins is befitting for producing the porous compact 25 that has accurate dimensions to critically conform to the recess 31 complicated in configuration. Moreover, the porous compact 25 of polyethylene or polypropylene, as there is less fear of clogging up at the specific portion coming into engagement with the rollers 5, can make certain of continuously positive application of lubricant around the rollers 5 during rolling-contact with the porous compact 25. The raised noses 26 of the porous compact 25 is made at the beveled tip 39 thereof in elliptic figure elongated in rolling direction of the rollers 5 in the turnaround passage 30 to continue keeping rolling-contact with the rollers 5 over a prolonged period of time, ensuring steady application of lubricant around the rollers 5.

With the linear motion guide unit of the present invention, the return passage 10 is constituted with a circular hole defined inside a sleeve 6 that fits into a fore-and-aft bore 9 made in the carriage 3 of the slider 2. The sleeve 6 is made of sintered resinous tubular member having cellular or porous structure befitting to impregnation with lubricant, whether monolithic or split into two halves. As an alternative, the sleeve 6 may be replaced by the tubular composition, which is composed of a tubular skeleton responsible for giving mechanical strength or stiffness to the tubular composition itself, and cellular or porous members high in capability of soaking up and retaining lubricant in cells or pores to lubricate adequately the rollers 5, the cellular members fitting into the tubular skeleton. The sleeve 6, although fitting loosely into the fore-and-aft bore 9, is held in accurate place by the spigots 33 raised above the end caps 4. The end cap 4 as shown in FIGS. 7 to 9 is made with the lubrication port 29 to be coupled with a grease nipple 43, and further has an oiling path 32 to connect the lubrication port 29 to the turnaround passage 30 to feed lubricant to the circulating circuit 45 as in the conventional end cap. The porous compact 25 is split into two halves along a middle plane including the lubrication port 29. As an alternative, neither the lubrication port 29 nor oiling path 32 to feed lubricant is needed because the porous compact 25 has the thick block 20 that is quite good enough for sustainable positive lubrication.

Figure 15:
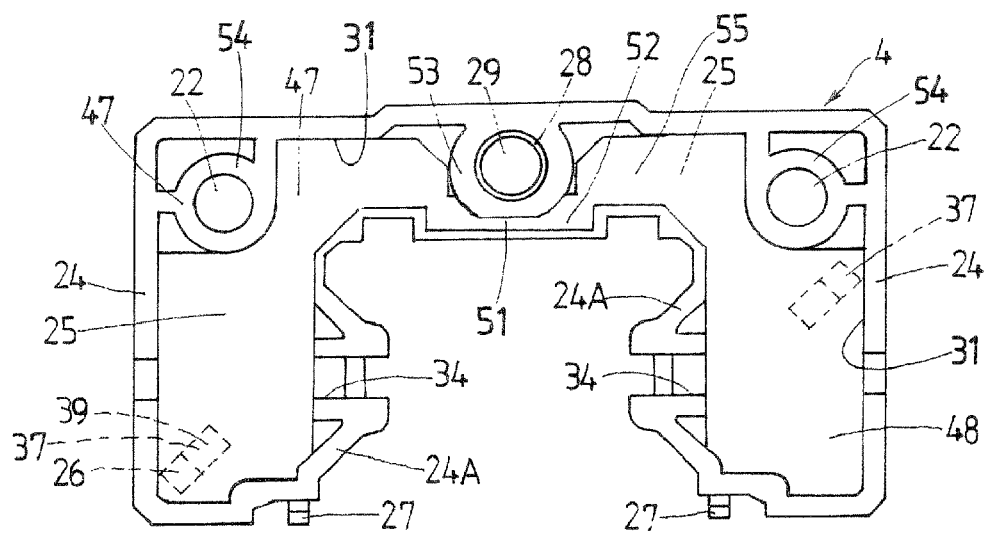
FIG. 15 is a view in front elevation of another version of the end cap of FIG. 1.
Figure 16:
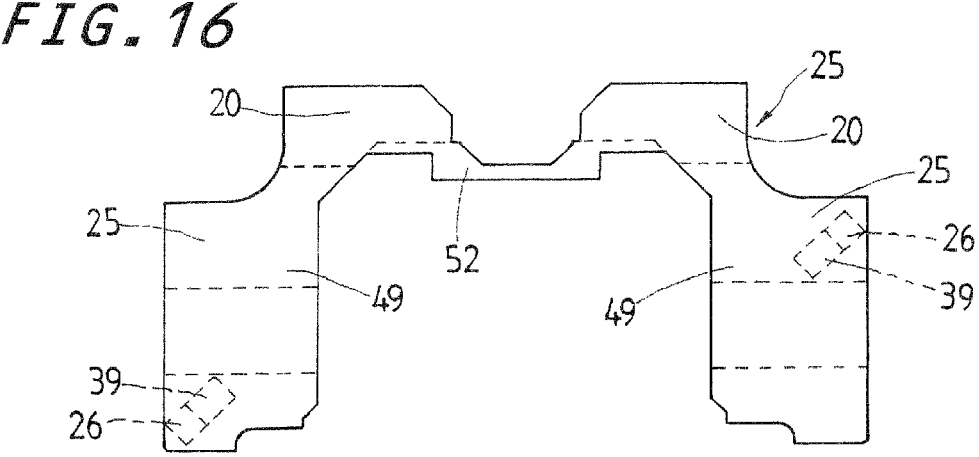
FIG. 16 is a view in front elevation of a further another version of the porous compact made to fit into a deep cavity made in the end cap of FIG. 15.
Figure 17:
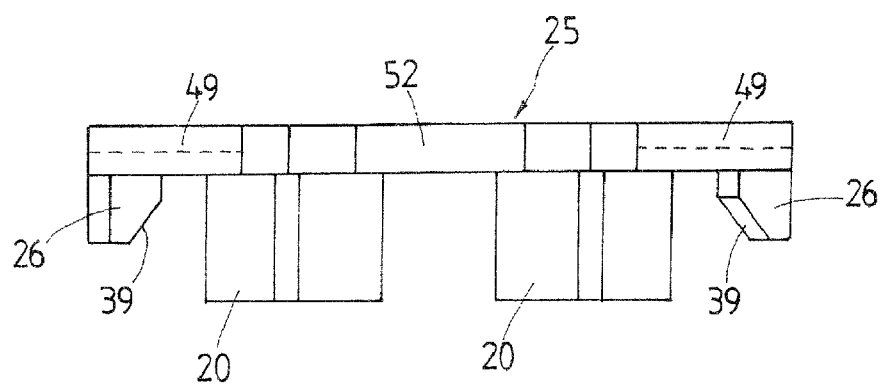
FIG. 17 is a view in bottom elevation of the porous compact of FIG. 16.

Referring to FIGS. 15 to 17, there is shown another version of the end cap 4, in which there remains some room for the provision of the recess 31 around the boss 53 having the lubrication port 29 therein. The left and right halves of the recess 31 separated sidewise from one another in perpendicular to the sliding direction of the end cap 4 communicates with each other at 51 just underneath the boss 53. Correspondingly, the porous compacts 25 conforming to the left and right halves of the recess 31 are joined together by a connecting part 52 of porous compact material, which fits into the communicating recess 51 to make the most of the overall recess 31, rendering the porous compact 25 as large as possible in volume. Like the first version shown in FIGS. 6 and 7, the second version of the porous compact 25 is basically made to fit into the recess 31 and composed of a thick block 20 to fit into the deep cavity 40 in the recess 31 to reserve considerable lubricant, a thin plate 19 to conform to the shallow shelf 49 in the recess 3, and a nose 26 raised above the thin plate 19 to extend into the associated pit 36 in the recess 31 in a way leading lubricant to towards the hole 37 opening to the turnaround passage 30. The second version of the porous compact 25, moreover, has the communicating part 52 of porous compact material to join together the left and right thick blocks 20. The noses 26 raised above their associated porous compacts 25 are different in location between the left and right porous compacts 25. As illustrated, the nose 26 raised above the right porous compact 25 is at middle location while the other of the left porous compact 25 is at lower corner.

With the linear motion guide unit constructed as stated earlier, the sustainable proper lubrication to the rollers 5 can be accomplished by the lubrication system simple in construction: only fitting the porous compact 25 impregnated with lubricant into the recess 31 made on the outward end surface 47 of the end cap 4. The lubrication system in the linear motion guide unit of the present invention is envisaged the application of lubricant to the rollers 5 heading towards the load-carrying races 20. In the linear motion guide unit of the present invention, thus, the rollers 5 are first applied with the lubricant during rolling through the turnaround passages 30, and then the rollers 5 coated with lubricant film enter the load-carrying races 20 in a circulating manner, accomplishing positive lubrication on the load-carrying races 20.

What is claimed is:

1. A linear motion guide unit, comprising:
    an elongated guide rail having a raceway surface extending in a lengthwise direction of the guide rail, and
    a slider allowed to move lengthwise of the elongated guide rail in a sliding manner, the slider being composed of a carriage having thereon a second raceway surface in opposition to the first raceway to define a load-carrying race between them and having therein a return passage extending in parallel with the load-carrying race, end caps secured to forward and aft ends of the carriage, one to each end, and made therein with turnaround passages joining the race and the return passage together with one another, an end seal secured on the end cap, and more than one rolling element of either ball or roller allowed to roll through a circulating circuit made up of the load-carrying race, return passage and the turnaround passages;
    wherein the end caps are each made to sink along the lengthwise direction below an outward surface thereof facing the associated end seal to thereby have a deep recess into which fits a porous compact of a shape conforming to the recess, the porous compact being impregnated with lubricant;
    wherein the end cap has a hole to communicate the recess with the associated turnaround passage to allow the porous compact exposing itself to the turnaround passage, coming into rolling-contact with the rolling element rolling through the turnaround passage to apply the lubricant on the rolling element;
    wherein the recess made in the end cap includes a deep cavity lying at topside of the end cap, a shallow shelf spreading downwards from the topside of the end cap, and a pit extending from the shelf to the hole that opens into the turnaround passage; and
    wherein the porous compact is composed of a thick block to fit into the deep cavity in the recess to reserve considerable lubricant, a thin plate to conform to the shallow shelf in conjunction with the thick block, and a nose raised above the thin plate to extend into the associated pit in a way leading lubricant to the hole opening to the turnaround passage.

2. A linear motion guide unit constructed as defined in claim 1, wherein a tip of the raised nose exposed to the turnaround passage is made elongated in rolling direction of the roller.

3. A linear motion guide unit constructed as defined in claim 1, wherein the thick block of the porous compact is prepared to snugly fit into the deep cavity, which is made in any one of sidewise opposed bulgy portions of the end cap at an upper region where there is no turnaround passage.

4. A linear motion guide unit constructed as defined in claim 1, wherein a pair of the circulating circuits is made in each of widthwise opposing sides of the slider in geometry that the turnaround passages of the paired circulating circuits intersect each other in the end caps in staggered relation in sliding direction of the slider.

5. A linear motion guide unit constructed as defined in claim 1, wherein the paired turnaround passages are staggered one another in the end caps to provide an outward turnaround passage and an inward turnaround passage which are spaced apart away from one another in any one of the end caps, and wherein the porous compacts expose themselves to the respective outward turnaround passages through the holes communicating the recess with the turnaround passages.

6. A linear motion guide unit constructed as defined in claim 1, wherein the hole in the end cap to communicate the recess with the turnaround passage is made nearer towards the return passage far away from the load-carrying race.

7. A linear motion guide unit constructed as defined in claim 1, wherein the recess is divided into two halves that are separated sidewise of the end cap from one another and the porous compacts fit into the halves of the recess in a fashion that any one of the porous compacts apply lubricant the rollers rolling through any one pair of the sidewise spaced circulating circuit pairs while another porous compact lubricates the rollers rolling through the other pair of the sidewise spaced circulating circuit pairs.

8. A linear motion guide unit constructed as defined in claim 1, wherein sidewise spaced halves of the recess are communicated with each other through a middle recess and the porous compacts conforming to the halves of the recess are joined together by a connecting part of porous compact material, which fits into the middle recess.

9. A linear motion guide unit constructed as defined in claim 1, wherein the porous compact is composed of a sintered resinous member having open-porous or open-cellular texture in which pores or cells preserved among fine particles are open to each other, serving to absorb lubricant, which fills pores or cells to be held better in the cellular texture.

10. A linear motion guide unit constructed as defined in claim 9, wherein the finely powdery synthetic resin is any one selected from polyethylene and polypropylene.

* * * * *